(12) United States Patent
Kobata et al.

(10) Patent No.: US 11,015,963 B2
(45) Date of Patent: May 25, 2021

(54) METHOD FOR CALIBRATING INSTRUMENT PROVIDED WITH IC TAG UNIT

(71) Applicant: KOBATA GAUGE MFG. CO., LTD., Osaka (JP)

(72) Inventors: Iwao Kobata, Osaka (JP); Yoshiyuki Nakai, Osaka (JP)

(73) Assignee: KOBATA GAUGE MFG. CO., LTD., Osaka (JP)

( * ) Notice: Subject to any disclaimer, the term of this patent is extended or adjusted under 35 U.S.C. 154(b) by 207 days.

(21) Appl. No.: 16/300,007

(22) PCT Filed: May 9, 2016

(86) PCT No.: PCT/JP2016/063758
§ 371 (c)(1),
(2) Date: Nov. 8, 2018

(87) PCT Pub. No.: WO2017/195251
PCT Pub. Date: Nov. 16, 2017

(65) Prior Publication Data
US 2019/0145802 A1 May 16, 2019

(51) Int. Cl.
*G01D 11/26* (2006.01)
*G01D 18/00* (2006.01)
(Continued)

(52) U.S. Cl.
CPC .............. *G01D 11/26* (2013.01); *G01D 7/00* (2013.01); *G01D 18/00* (2013.01); *G08C 17/02* (2013.01);
(Continued)

(58) Field of Classification Search
CPC .... G01D 7/00; G01D 11/24–26; G01D 18/00; G01L 19/148; G01L 19/16; H04Q 9/00; H04Q 2209/47; H04Q 2209/60
See application file for complete search history.

(56) References Cited

U.S. PATENT DOCUMENTS 6,742,396 B2 * 6/2004 Schenk, Jr. ............ G01D 13/26
73/735
7,509,848 B2 * 3/2009 Chen ....................... G01L 19/12
73/146
(Continued)

FOREIGN PATENT DOCUMENTS

JP 2003-323686 A 11/2003
JP 2005-316681 A 11/2005
(Continued)

OTHER PUBLICATIONS

International Search Report issued in Application No. PCT/JP2016/063758, dated Aug. 16, 2016.

*Primary Examiner* — Justin N Olamit
(74) *Attorney, Agent, or Firm* — Michael Best & Friedrich LLP

(57) ABSTRACT

An IC unit includes a scale increment reading module that is configured to: detect, when an indicator in an instrument rotates, rotation of the indicator, and convert the rotation into rotation data; and an antenna that is configured to transmit the rotation data wirelessly from the IC tag unit to a reader. The instrument includes a scale plate, scale increments on the scale plate remain viewable when the IC tag unit is affixed to the instrument. The instrument includes a transparent cover plate, the IC tag unit is affixed to the transparent cover plate when the IC tag unit is affixed to an instrument. The IC tag unit is calibrated by rotating the IC tag unit until an indicating portion of the indicator overlaps a first pointer on the scale plate.

1 Claim, 12 Drawing Sheets

(51) Int. Cl.
*G08C 17/02* (2006.01)
*G01D 7/00* (2006.01)
*H04Q 9/00* (2006.01)

(52) U.S. Cl.
CPC ........... *H04Q 9/00* (2013.01); *H04Q 2209/47* (2013.01); *H04Q 2209/60* (2013.01)

(56) References Cited

U.S. PATENT DOCUMENTS

| | | | | |
|---|---|---|---|---|
| 8,441,402 | B2 * | 5/2013 | Gawronski | G01L 19/14 343/720 |
| 9,677,919 | B2 * | 6/2017 | Kielb | G01D 21/02 |
| 9,934,458 | B2 * | 4/2018 | Kobata | G06K 19/07775 |
| 2007/0229229 | A1 | 10/2007 | Nelson et al. | |
| 2015/0022010 | A1 * | 1/2015 | Leabman | H02J 7/00034 307/104 |
| 2017/0140256 | A1 | 5/2017 | Kobata et al. | |

FOREIGN PATENT DOCUMENTS

| | | |
|---|---|---|
| JP | 2009-532753 A | 9/2009 |
| JP | 3161399 U | 7/2010 |
| WO | WO-2015/174374 A1 | 11/2015 |

* cited by examiner

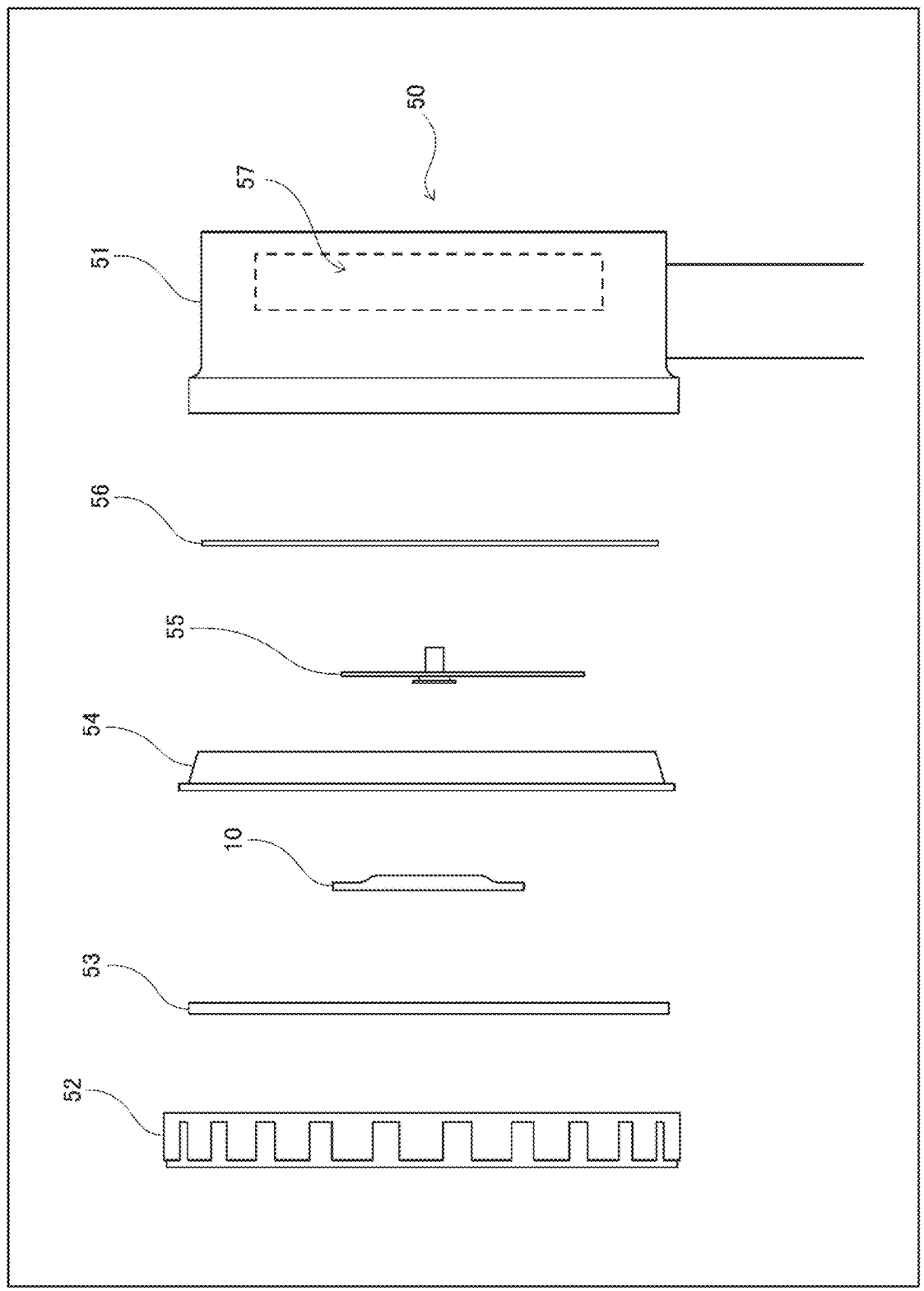

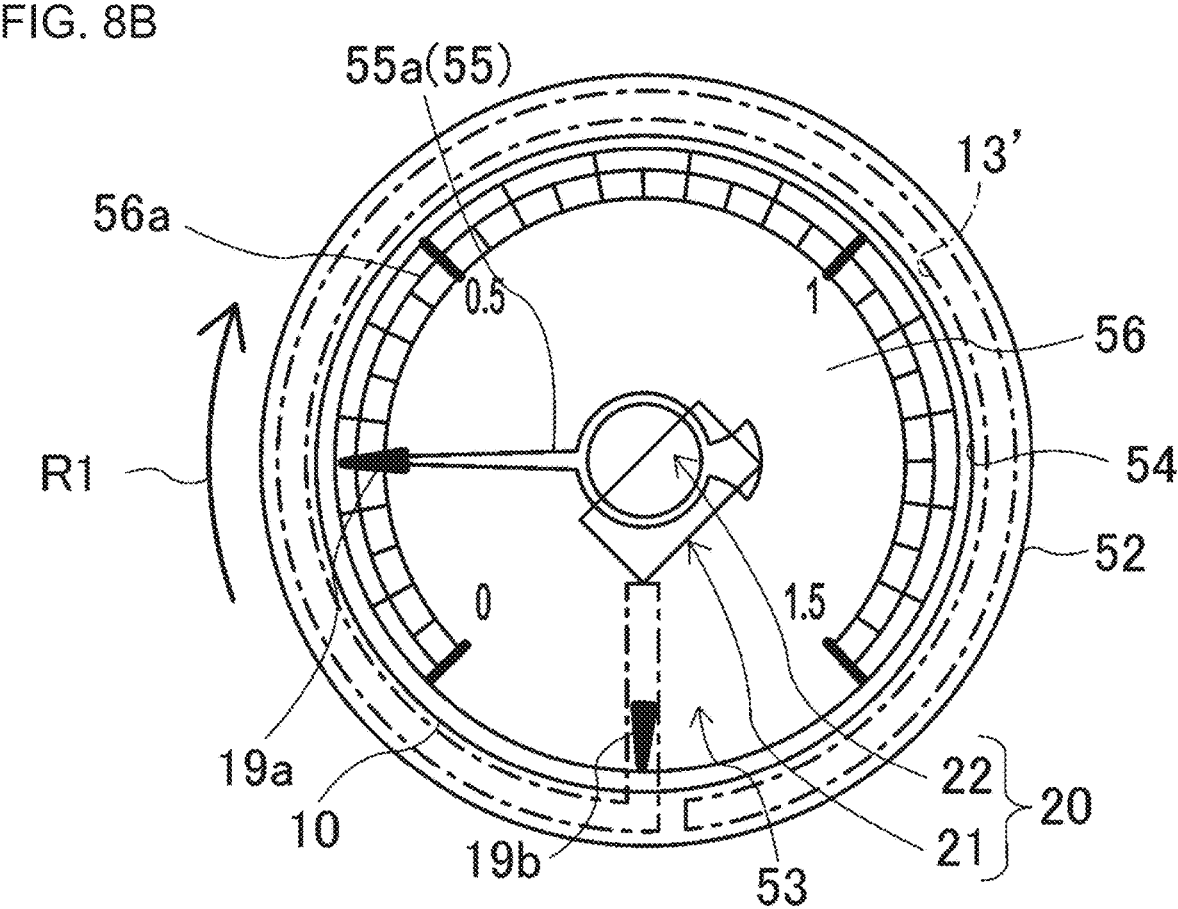

METHOD FOR CALIBRATING INSTRUMENT PROVIDED WITH IC TAG UNIT

TECHNICAL FIELD

The present invention relates to an IC tag unit for an instrument, an IC tag system for an instrument, an instrument provided with the IC tag unit, and a method for calibrating an instrument provided with the IC tag unit. More specifically, the present invention relates to an IC tag unit for an instrument, the IC tag unit configured to be mounted to an instrument, the instrument having: a scale plate and an indicator; and a transparent cover plate which covers the scale plate and the indicator, the scale plate provided with scale increments. The IC tag unit includes: an IC tag including an IC chip and an antenna, the IC tag being capable of communicating stored information by a radio wave in a contactless manner; and a mounting medium configured to mount the IC tag to the transparent cover plate and hold the IC tag. The IC tag unit is configured to be used together with a wireless reader which performs wireless communication with the IC tag. The present invention also relates to: an IC tag system for an instrument; an instrument provided with the IC tag unit; and a method for calibrating an instrument provided with the IC tag unit.

BACKGROUND ART

An IC tag unit described in PATENT DOCUMENT 1 is known as an IC tag, when mounted to an existing instrument, that can be used as a support device for checking calibration of the instrument and for performing periodic inspection of the instrument, the existing instrument including, for example, industrial instruments such as pressure gauges, thermometers, flowmeters, and power meters. The IC tag unit includes: an IC tag capable of communicating stored information by a radio wave in a contactless manner; and a mounting means for mounting the IC tag to an instrument. The IC tag unit allows the IC tag, into and from which instrument information, calibration information, inspection information, and the like can be written and read, to be mounted to an instrument without subjecting the IC tag to influence by a metal portion of the instrument body, without impairing visibility of scale increments of the instrument, and further without causing deterioration of the IC tag due to dust, raindrops, or the like. In addition, an RFID that transmits and receives a radio wave having RF (Radio Frequency), thus drives the IC chip by electromotive force of electromagnetic wave, and communicates with a memory of the IC chip by a radio wave, is used. However, when a measurement value is to be checked, a person needs to check the measurement value by viewing and record the measurement value.

As a device that can be retrofitted to an analog instrument, that can computerize numerical values of the instrument without impairing the calibration state of the instrument, a device described in PATENT DOCUMENT 2 is known. However, according to PATENT DOCUMENT 2, a transparent cover plate requires special processing, and wires are exposed to the scale plate side, and thus, visibility is also impaired.

CITATION LIST

Patent Documents

[PATENT DOCUMENT 1] International Publication WO 2015/174374
[PATENT DOCUMENT 2] Utility Model Registration No. 3161399

SUMMARY OF THE INVENTION

Problems to be Solved by the Invention

In view of the aforementioned circumstances of the conventional arts, an object of the present invention is to provide: an IC tag unit, for an instrument, that can be retrofitted to an analog instrument, that does not impair the visibility and the calibration state of the instrument, that can read a value indicated by an indicator and wirelessly take out the value to outside; an IC tag system for an instrument; an instrument provided with the IC tag unit; and a method for calibrating an instrument provided with the IC tag unit.

Solutions to the Problems

In order to achieve the object described above, an IC tag unit, for an instrument, according to an aspect of the present invention is an IC tag unit for an instrument, the IC tag unit configured to be mounted to an instrument, the instrument having: a scale plate and an indicator; and a transparent cover plate which covers the scale plate and the indicator, the scale plate provided with scale increments. The IC tag unit includes: an IC tag including an IC chip and an antenna, the IC tag being capable of communicating stored information by a radio wave in a contactless manner; and a mounting medium configured to mount the IC tag to the transparent cover plate and hold the IC tag. The IC tag unit is configured to be used together with a wireless reader which performs wireless communication with the IC tag. In the IC tag unit, the IC tag unit further includes a scale increment reading module which reads operation of the indicator. The IC tag performs wireless communication with the wireless reader via the antenna. The IC tag is provided on the mounting medium at a position where the IC tag is not overlapped, in a viewing direction, with any of the scale increments and an indicating portion of the indicator at a time of mounting the IC tag to the transparent cover plate. The scale increment reading module includes a sensor which is opposed to the indicator on the mounting medium and which reads a position of the indicator on the basis of relative movement thereof.

According to this aspect, the IC tag unit is mounted to the transparent cover plate, and even when the IC tag unit is located inside the instrument, the calibration state and the function of the instrument is not impaired. On the basis of relative movement (rotation) between the scale increment reading module and the indicator, the indicated value is read. The wireless reader may be provided outside the instrument and can have a relatively sufficient battery mounted therein. Thus, while performing mutual short range communication, the wireless reader can supply sufficient operation power to the IC tag unit. As a result, even when the instrument becomes dirty and the indicator cannot be read, monitoring can be continued, and even if the transparent cover plate of the instrument is contaminated, there is no problem.

The wireless reader may include a module for short range wireless communication to be performed with the IC tag, and may further include a long range wireless communication module for long range wireless communication. According to this aspect, substantially real time monitoring of the indicator is enabled.

In the configuration described above, the mounting medium may hold the sensor such that the sensor is located near a center axis of the indicator, and a marker which specifies an angle on the basis of rotation thereof relative to the sensor may be mounted near the center axis of the indicator. Since the indicator is detected not directly but through the marker, the scale increment reading module can obtain a stable value indicated by the indicator.

In the configuration described above, the mounting medium may have a pair of pointers that indicates positions of a minimum value and a maximum value of the indicator, and each of the pointers can be aligned with the indicator by rotating the mounting medium relative to the marker fixed to the indicator. According to this aspect, the transparent cover plate also has a circular shape, and is caused to perform relative rotation with the axis of the indicator of the instrument aligned therewith. Therefore, settings with regard to the zero point and the maximum point can be performed without changing the value of the instrument, which is convenient.

Further, the instrument may include a facing, and the antenna may be provided along the facing so as to surround the scale plate. According to this aspect, provision of a large antenna can be ensured without being influenced by a metal portion, and it is possible to stably supply power by use of wireless communication having a long wavelength.

In order to achieve the object described above, an IC tag system, for an instrument, according to an aspect of the present invention is an IC tag system for an instrument, the IC tag system including: the IC tag unit for an instrument and the wireless reader according to the configuration of the aspect described above, wherein the wireless reader has a power source from which power to be supplied to the power module of the IC tag is obtained. In this case, the wireless reader may include a battery as the power source, or the wireless reader may include a solar battery as the power source. The wireless reader may be implemented as a reader writer.

Further, in order to achieve the object described above, in an instrument provided with an IC tag unit according to an aspect of the present invention and having the configuration provided with the IC tag unit according to the configuration of the aspect described above, the mounting medium may hold the sensor such that the sensor is located near a center axis of the indicator, and a marker which specifies an angle on the basis of rotation thereof relative to the sensor may be mounted near the center axis of the indicator.

In order to achieve the object described above, a method for calibrating an instrument provided with an IC tag unit according to an aspect includes: in a configuration having a pair of the pointers, performing zero point calibration by rotating the IC tag unit together with the transparent cover plate such that a first pointer is overlapped with the indicating portion of the indicator; performing maximum point calibration by rotating the IC tag unit together with the transparent cover plate such that a second pointer is overlapped with the indicating portion, and rotating the IC tag unit together with the transparent cover plate until the first pointer and the second pointer are overlapped with corresponding portions of the scale increments of the scale plate.

Advantageous Effects of the Invention

According to the configuration of the aspects of the present invention described above, it has become possible to provide: an IC tag unit for an instrument that can be retrofitted to an analog instrument, that does not impair the visibility and the calibration state of the instrument, and that can read a value indicated by an indicator and wirelessly take out the value to outside; an IC tag system for an instrument; an instrument provided with the IC tag unit; and a method for calibrating an instrument provided with the IC tag unit.

Other objects, configurations, and effects of the present invention will become apparent from the following description of embodiments of the present invention.

BRIEF DESCRIPTION OF THE DRAWINGS

FIG. 2 is an exploded side view of FIG. 1B.

FIG. 8B is a diagram showing the relationship between the IC tag unit and the indicator and is a diagram showing a state at the time of zero point calibration, according to the fourth embodiment of the present invention.

DESCRIPTION OF EMBODIMENTS

Hereinafter, embodiments of the present invention will be described in detail with reference to the drawings. First, with reference to FIGS. 1 to 6, a first embodiment is described.

Figure 3:
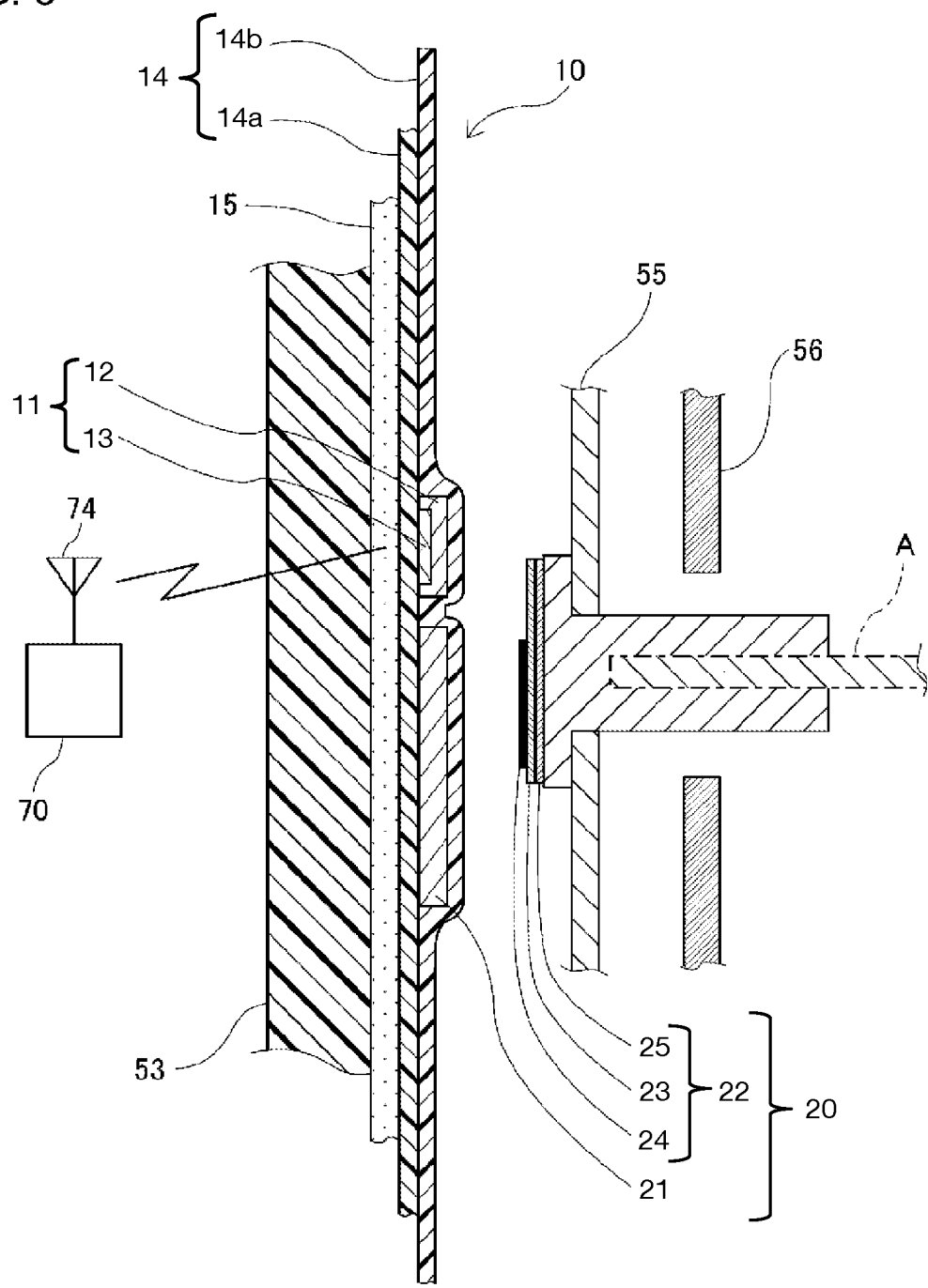
FIG. 3 is a cross-sectional view of a main part of FIG. 1B.
Figure 4:
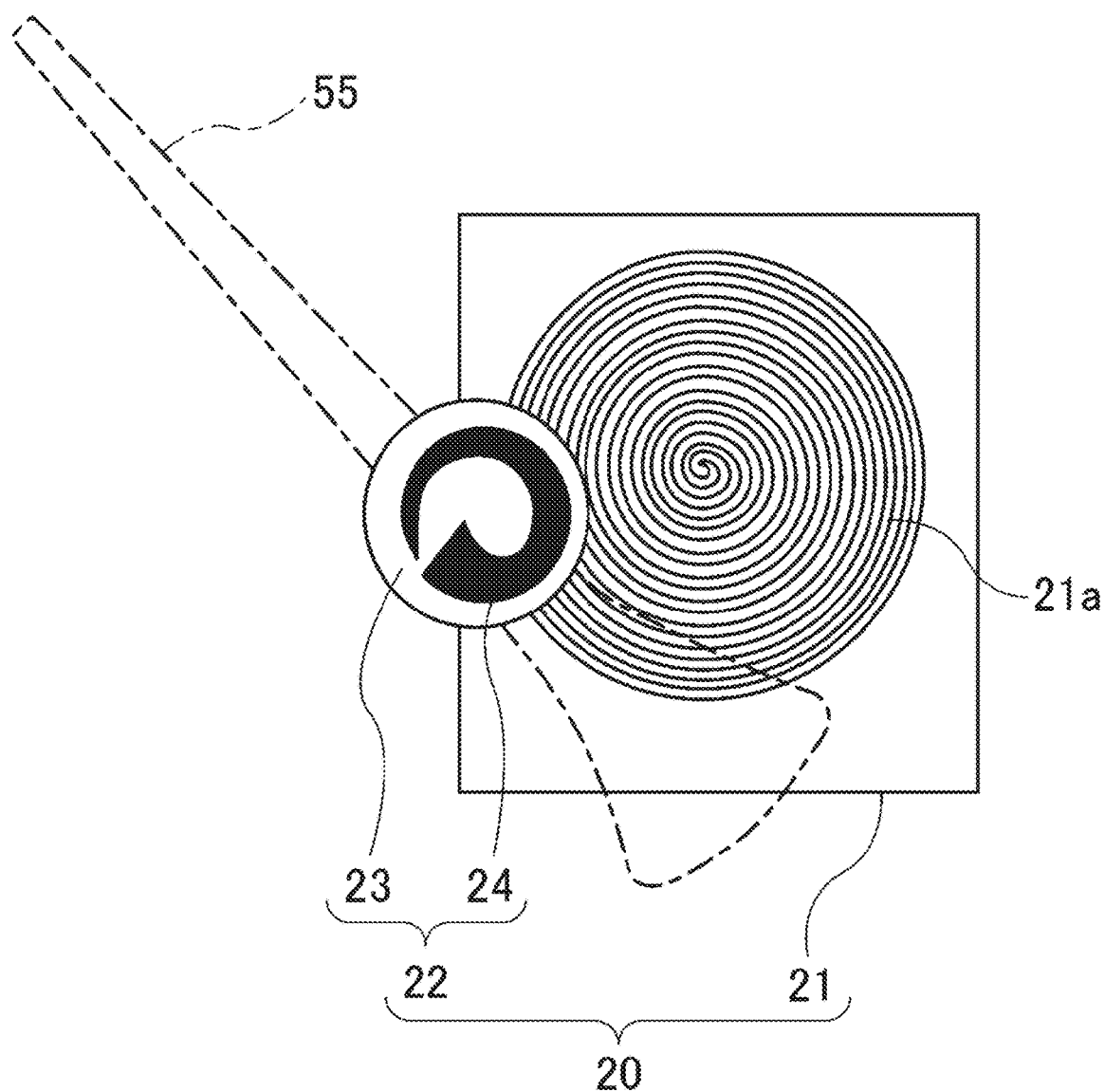
FIG. 4 is a plan view of a scale increment reading module shown in FIG. 3.
Figure 5:
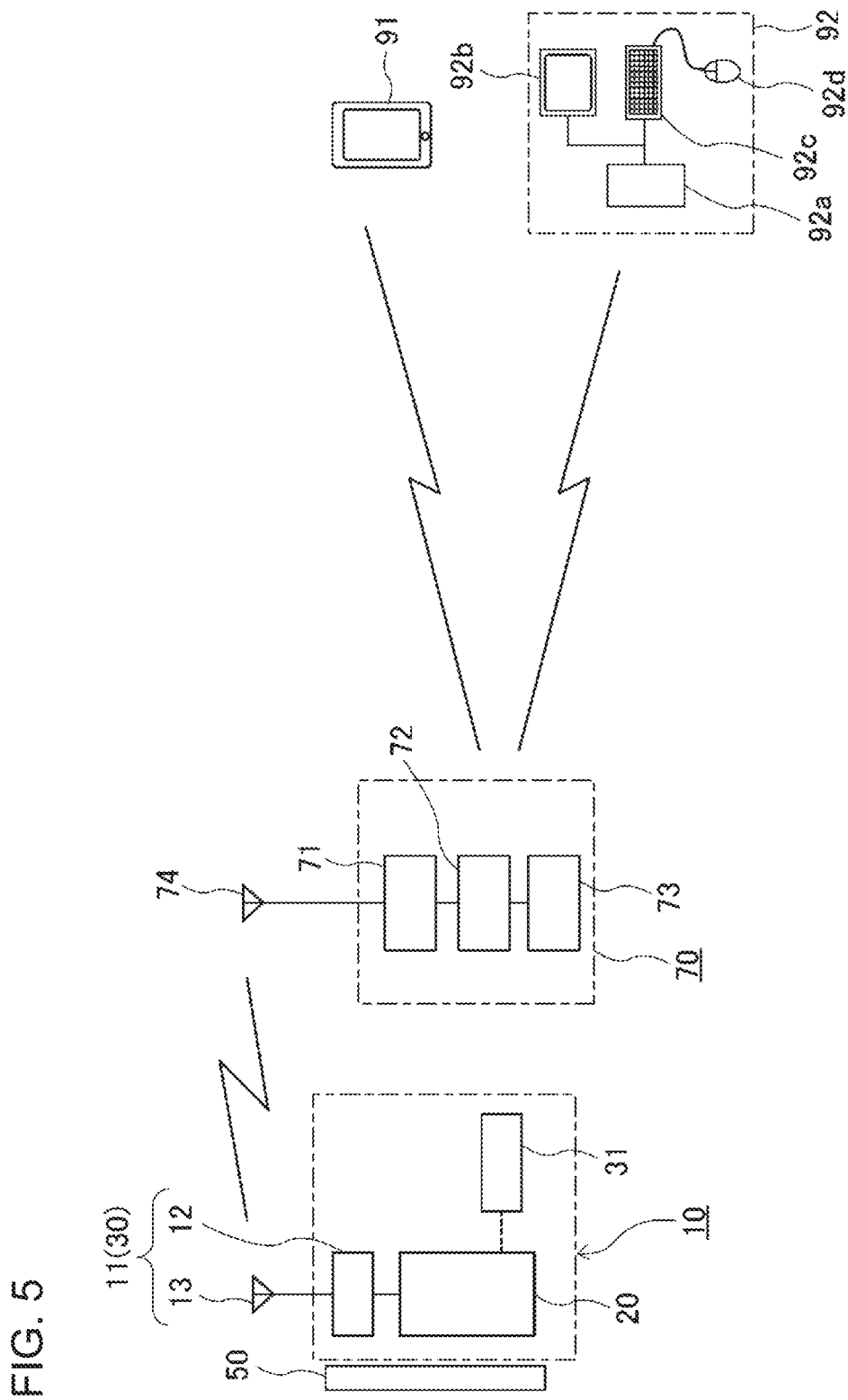
FIG. 5 is a block diagram showing a configuration of an IC tag system for an instrument according to the present invention.

In an instrument 50 having mounted thereto an IC tag unit 10, for an instrument, according to the present invention, as shown in FIGS. 1 to 3, a Bourdon tube mechanism 57 is supported in a case body 51, and a rotation shaft extending from the Bourdon tube mechanism 57 is inserted into a scale plate 56 to mount an indicator 55. Accordingly, the indicator 55 is rotated relative to scale increments 56a of the scale plate 56 by action of the Bourdon tube mechanism 57 and indicates a pressure. To the front face of the scale plate 56, a transparent cover plate 53 for protecting the scale plate 56 is provided, and is supported by the case body 51 as a result of a cover 52 being engaged by a thread with the case body 51 with a facing 54 interposed between. Here, a Bourdon tube pressure gauge is used as an example, but the present invention can be applied to any type of instrument that has an indicator.

The scale increments 56a of the scale plate 56 are arranged in an arc shape around the center axis of the indicator 55. In this example, the tip of the indicator 55 rotates from a scale increment of 0 to 1.5, due to pressure applied from below to the Bourdon tube mechanism 57, to indicate a pressure. As instrument information, the name of the manufacturer, the kind of the instrument such as, for example, pressure gauge or flowmeter, the performance (heat resisting, anti-shock, or the like) and accuracy class of the instrument, and use condition (use no oil, use no water, main part SUS, or the like) are indicated near the center of the scale plate 56. Further, the emblem of the company or the like is indicated therebelow.

The IC tag unit 10 for an instrument has an IC tag 11 provided between a first sheet 14a and a second sheet 14b, and the first sheet 14a and the second sheet 14b are adhered to each other by thermocompression bonding or in an unheated manner, whereby the IC tag 11 is held in a waterproof state by the sheet 14. On the front face of the first sheet 14a, an attachment layer 15, formed from an adhesive, for attachment to the transparent cover plate 53 is provided. Both the first sheet 14a and the second sheet 14b are formed from a deformable synthetic resin. Alternatively, for one or both thereof, a glass or hard synthetic resin sheet may be used. In the present embodiment, for the sheet 14, a transparent synthetic resin sheet is used so as not to impair the visibility of the scale plate 56. The attachment layer 15 is similarly transparent. The first sheet 14a and the second sheet 14b, and the attachment layer 15 have circular shapes having the same diameter, and the diameter is smaller than the inner diameter of the cover 52. However, the diameter may be close to the inner diameter or may be slightly smaller than the inner diameter.

As shown in FIGS. 1 to 3, the IC tag 11 includes an IC chip 12 and an antenna 13 each of which is attached to the first sheet 14a. As shown in FIG. 1, the IC chip 12 is provided near the center of the indicator 55, and the antenna 13 is provided on the IC chip. In the present invention, for the antenna 13, an RFID provided with a power module 31 which transmits and receives a radio wave having RF (Radio Frequency), thus drives the IC chip 12 by electromotive force of electromagnetic wave, and communicates with a memory of the IC chip 12 by a radio wave, is used.

In the memory of the IC chip 12 of the IC tag unit 10 for an instrument, information is stored such as an inspection state before attachment to the instrument or an inspection state at the time of an inspection, a unique ID number of the instrument 50, the model of the instrument 50, calibration time limit of the instrument 50, date of previous inspection of the instrument 50, scheduled date of the next inspection, the name of an inspection operator, and time stamp.

The antenna 13 is formed on the IC chip 12 by etching of a metal, or the like in this example. However, the antenna 13 may also be formed by printing or vapor deposition on the sheet 14. Further, by an "application and crystallization method" in which: a coating-type organic semiconductor "alkyl DNBDT" is used; and when application onto the sheet 14 is performed, crystallization simultaneously occurs to form a film, an RFID logic circuit may be produced with use of only an organic TFT rectifier, and may be used as the IC tag 11.

Figure 1A:
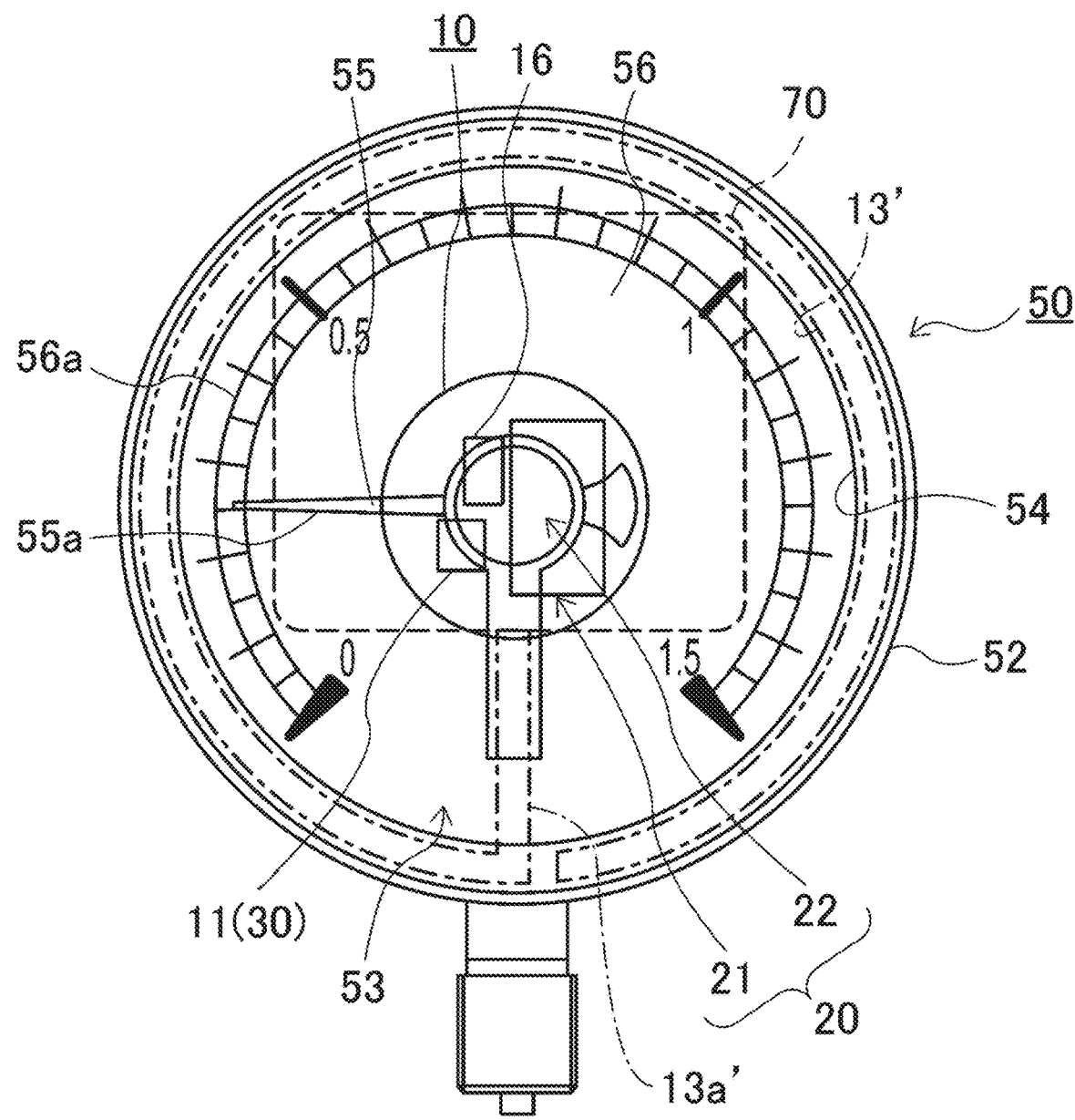
FIG. 1A is a front view of an instrument that is provided with an IC tag unit for an instrument according to a first embodiment of the present invention.
Figure 1B:
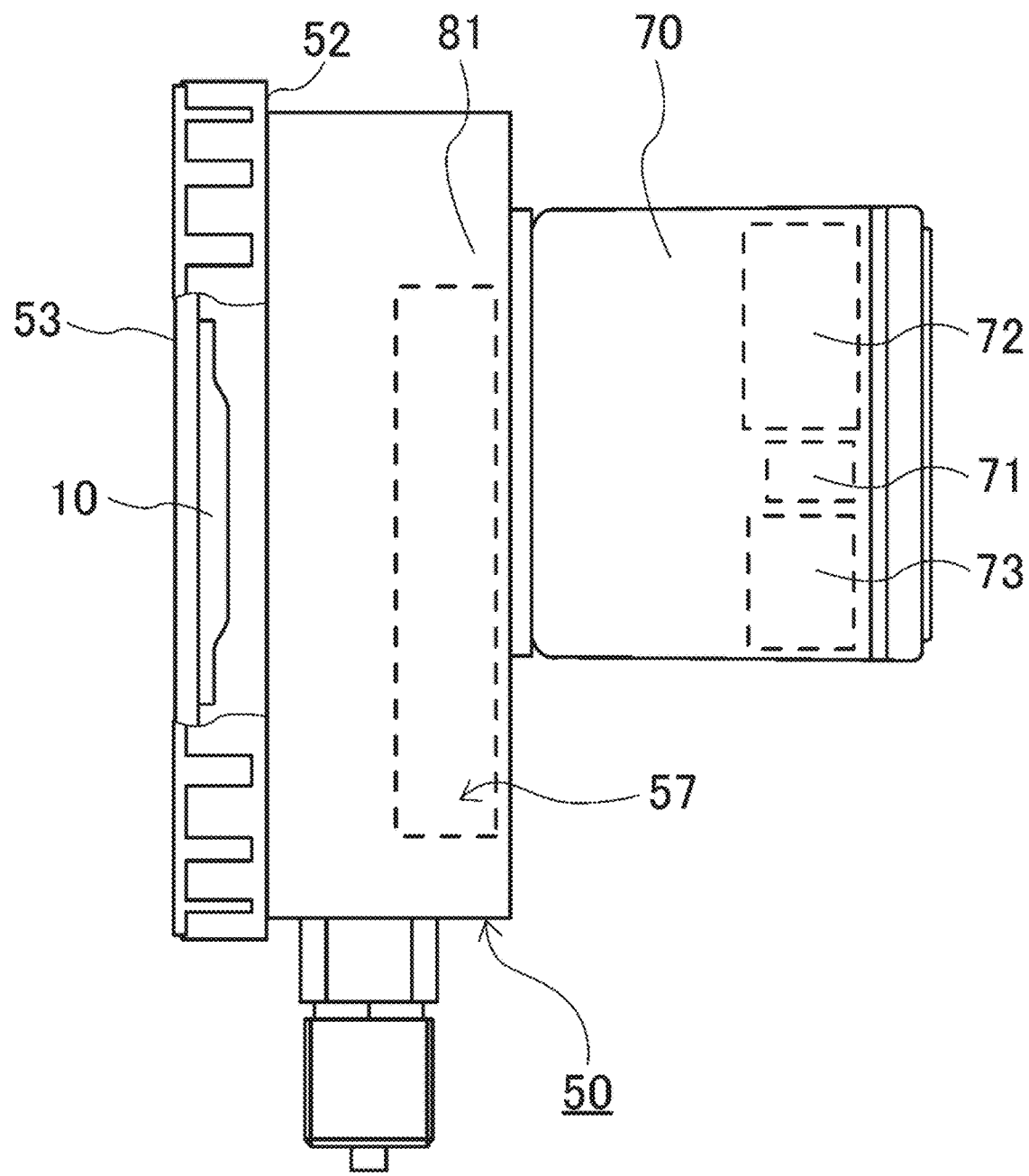
FIG. 1B is a partially-cut side view.
Figure 1C:
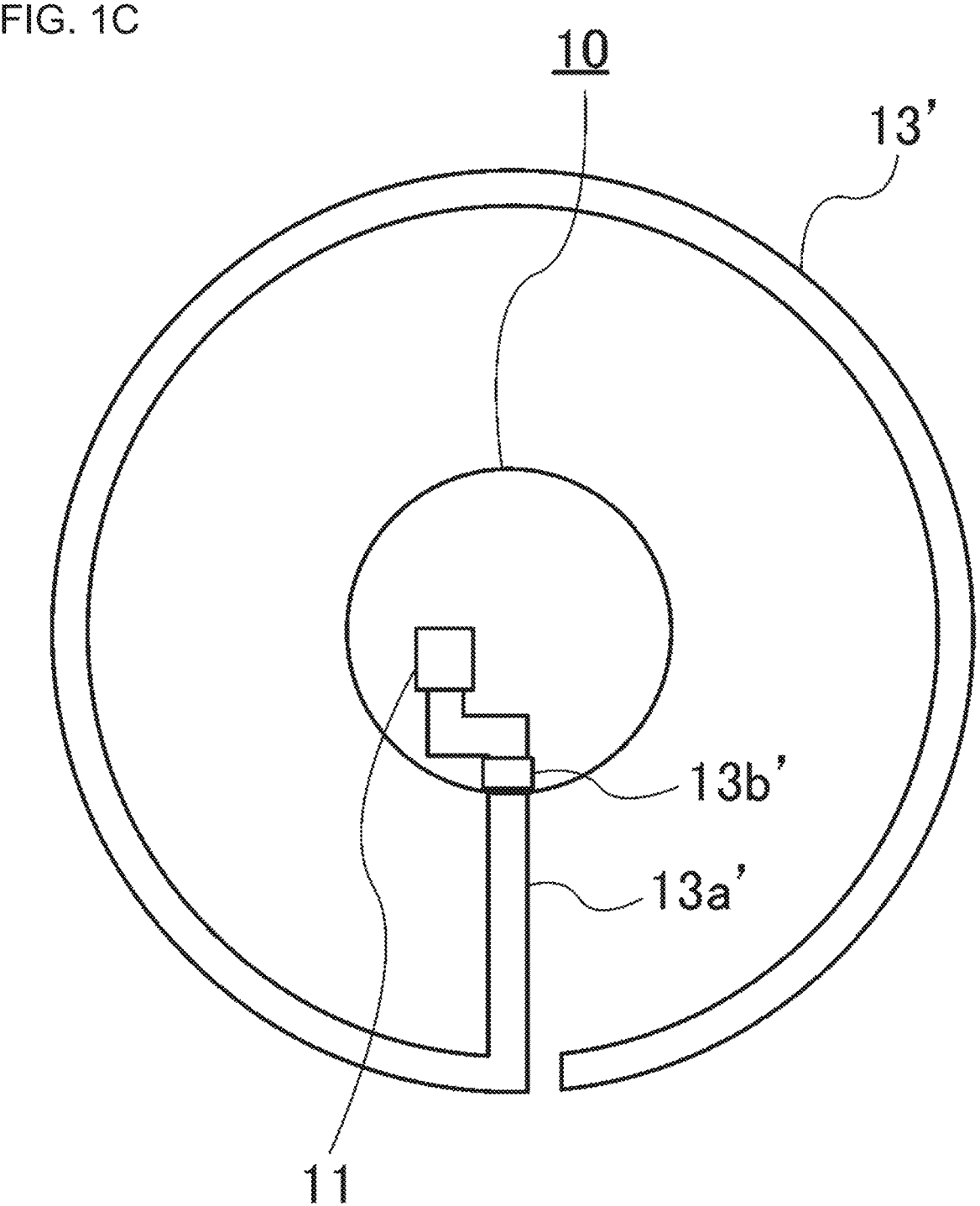
FIG. 1C is a front view of the IC tag unit only.

As indicated by the reference character 13' in FIG. 1A and FIG. 1C, the antenna 13 may be formed as a laminate of a metal foil or resin and a metal foil or etching so as to have such an arc shape that surrounds the scale plate 56, and the antenna 13 may be attached to the facing 54. When the facing 54 is made of resin, magnetic influence from the case body 51 and the cover 52 can be prevented, and in addition, since the dimensions are large, an RF wave having a long wavelength and large feeding energy can be received. The IC chip 11 and the antenna 13' are connected by means of an extraction portion 13a' and an attachable/detachable connector 13b'.

As a material of the sheet 14, for example, one of a biaxially-oriented nylon film, a biaxially-oriented polypropylene (OPP) film, a biaxially-oriented polyester resin film, or the like, or a laminate thereof, is used, and a biaxially-oriented polyester resin film is particularly preferably used. The thermoplastic resin layer may be any thermoplastic resin layer that is melted by heat to fuse laminates to each other, and thus allows the RFID tag to be accommodated. For the thermoplastic resin layer, for example, one, or two or more selected from a low-density polyethylene, a medium-density polyethylene, a high-density polyethylene, a linear (flocculent) low-density polyethylene, an ethylene-α-olefin copolymer obtained by polymerization using a metallocene catalyst (single site catalyst), a polypropylene, an ethylene-vinyl acetate copolymer, an ionomer resin, an ethylene-ethyl acrylate copolymer, an ethylene-acrylic acid copolymer, an ethylene-methacrylic acid copolymer, an ethylene-propylene copolymer, a methylpentene polymer, an acid-modified polyolefin resin obtained by modifying a polyolefin resin such as a polyethylene or polypropylene with an unsaturated carboxylic acid such as acrylic acid, methacrylic acid, maleic anhydride, or fumaric acid, and the like, can be used. The thickness of the thermoplastic resin layer is preferably about 10 μm to 100 μm in consideration of heat sealing property and the like. The same applies to the laminate material of the antenna 13'.

Further, for the transparent cover plate 53 and a member 23, not only the material of the sheet 14 formed so as to be hard as described above but also an acrylic plate, a polycarbonate plate, a glass plate, or the like can be used. For the attachment layer 15, for example, an acrylic adhesive can be used, or an adhesive containing an acrylic polymer and a crosslinking agent may be used. The sheet 14 is attached to the transparent cover plate 53 by the attachment layer 15, whereby strength of the transparent cover plate 53 is enhanced and crack or scattering is prevented.

A scale increment reading module 20 includes a proximity sensor 21 provided on the sheet 14, and a conductive target 22 provided near the center axis of the indicator 55. For the proximity sensor 21, an induction type proximity sensor, which is a proximity sensor capable of detecting movement of an indicator in a contactless manner, is used. Not limited to this, a capacitance type proximity sensor may be used, an optical proximity sensor may be used, or another sensor such as a magnetic sensor obtained by attaching a magnet to an indicator to perform detection may be used.

As shown in FIGS. 1A to 1C, 3, and 4, in the conductive target 22, a conductive pattern 24 in a spiral shape is formed on a sheet 23 by etching, printing, or the like, and is attached near the center of the indicator 55 through an attachment layer 25 formed from an adhesive material or the like. The proximity sensor 21 has a detection coil 21a. The thickness of the spiral located close to the detection coil 21a changes due to rotation of the indicator 55, and the proportion between the conductive layer and the insulation layer changes. Accordingly, the rotation of the conductive target, i.e., the rotation angle of the indicator 55 can be detected.

In the present embodiment, the conductive target 22 is used so as to enable detection even when the indicator is made of resin. However, when the indicator 55 is made of metal, the indicator 55 may be directly detected by the proximity sensor without using the conductive target 22. For the proximity sensor, for example, one of LDC 1000 series of Texas Instruments Inc. can be used.

In the present embodiment, as shown in FIGS. 1A to 1C, 3, and 5, a long range communication unit 70 is fixed to the rear face of the instrument 50 and used as a wireless communication device. The long range communication unit 70 includes: a short range communication module 71 which performs short range communication with the IC tag unit 10 described above; a long range communication module 72 which performs long range communication in accordance with a specification such as 3G or wifi (registered trade mark); a battery 73 for driving these; and an antenna 74 used for each of short range communication and long range communication. The long range communication module 72 can be operated by a mobile terminal having a UIF such as a smartphone 91, or a personal computer 92. The personal computer includes: a body 92a having a CPU, a memory, and a bus; a display 92b; a keyboard 92c; a mouse 92d; and the like.

For the short range communication, a communication method such as RFID, BLE (Bluetooth Low Energy (Bluetooth is a registered trade mark)), or the like that is operable at weak power can be used. Induction current is supplied by the short range communication module 71, whereby power can be supplied via the power module 31 to the RFID and the proximity sensor 21, and the pressure value can be read even in a state where the indicator cannot be seen, such as when the glass is dirty. Further, the threshold for monitoring the pressure can be changed and error processing can be changed, by the smartphone 91 or the PC 92 (hereinafter, the smartphone 91 or the like).

The proximity sensor 21 includes an A/D conversion unit in addition to the detection coil 21a. The rotation angle (i.e., pressure value) of the indicator 55 as an analog value read by the detection coil 21a is converted into a digital value by the A/D conversion unit, and the obtained digital value is transmitted to the short range communication module 71 through low-power-consumption short range wireless communication by the IC tag unit 10. Further, data is periodically transmitted by the long range communication unit 10 to the smartphone 91 and the personal computer 92 at remote places.

One example of a method for manufacturing the IC tag unit 10 for an instrument is described. First, to the first sheet 14a having one face that has the attachment layer 15 and release paper provided thereon, the IC chip 12 and the antenna 13 are mounted in advance by an adhesive or by another manner. Meanwhile, a thermoplastic resin is applied to the surface, of the second sheet 14b, opposing the first sheet 14a, and the two sheets, which are the first sheet 14a and the second sheet 14b, are attached to each other by heat and pressure being applied (attaching of resins to each other by the thermoplastic resin being heated and melted) or by pressure being applied without heating (adhesive component is contained between the films). Thereafter, the sheets are cut into a circular shape according to the size of the instrument.

When the IC tag unit 10 for an instrument is to be mounted, the release paper for protecting the attachment layer 15 is separated, the cover 52 and the transparent cover plate 53 are removed, and the center of the sheet 14 and the center of the transparent cover plate 53 are aligned with each other as accurately as possible, and the IC tag unit 10 is attached to the reverse surface of the transparent cover plate 53 by the attachment layer 15. Consideration is given for a pressure gauge such that any user can easily attach the IC tag unit 10 for an instrument on the user end. This corresponds to a repair within the "minor repair" that is allowed by the Measurement Act of Japan and is specified in Article 10 of Ordinance for enforcement of the Measurement Act, and corresponds to a repair that does not affect accuracy and performance of a specified measuring instrument (notification of a repair business, and removing of a verification mark or the like are unnecessary and any one can make the repair).

Calibration and initial setting at the time of mounting the tag unit 10 are described. In a state where the instrument 50 is not under pressure, the smartphone 91 or the like is operated such that the value obtained by the proximity sensor 21 described above is stored as a zero value in the IC tag 11. Next, pressure is applied to the instrument 50 such that the indicator 55 indicates the maximum value, and the smartphone 91 or the like is operated such that the value at this time is stored as the maximum value in the IC tag 11. In this manner, calibration of the maximum value is performed, and together with the afore-mentioned minimum value, output (voltage value) of the proximity sensor 21 can be converted into a pressure value.

The values obtained in this calibration are stored in a memory of the IC tag of the IC tag sensor unit together with the date and time of the calibration performed. Further, settings such as an interval at which data of the sensor is transmitted, clock adjustment, and a pressure value for which an alert mail is issued, are performed via the mobile terminal and the long range communication unit.

Next, other embodiments of the present invention will be described. In the description below, the same components as those in the embodiment described above are denoted by the same reference characters. Further, the embodiments can be implemented in combinations thereof.

Figure 6:
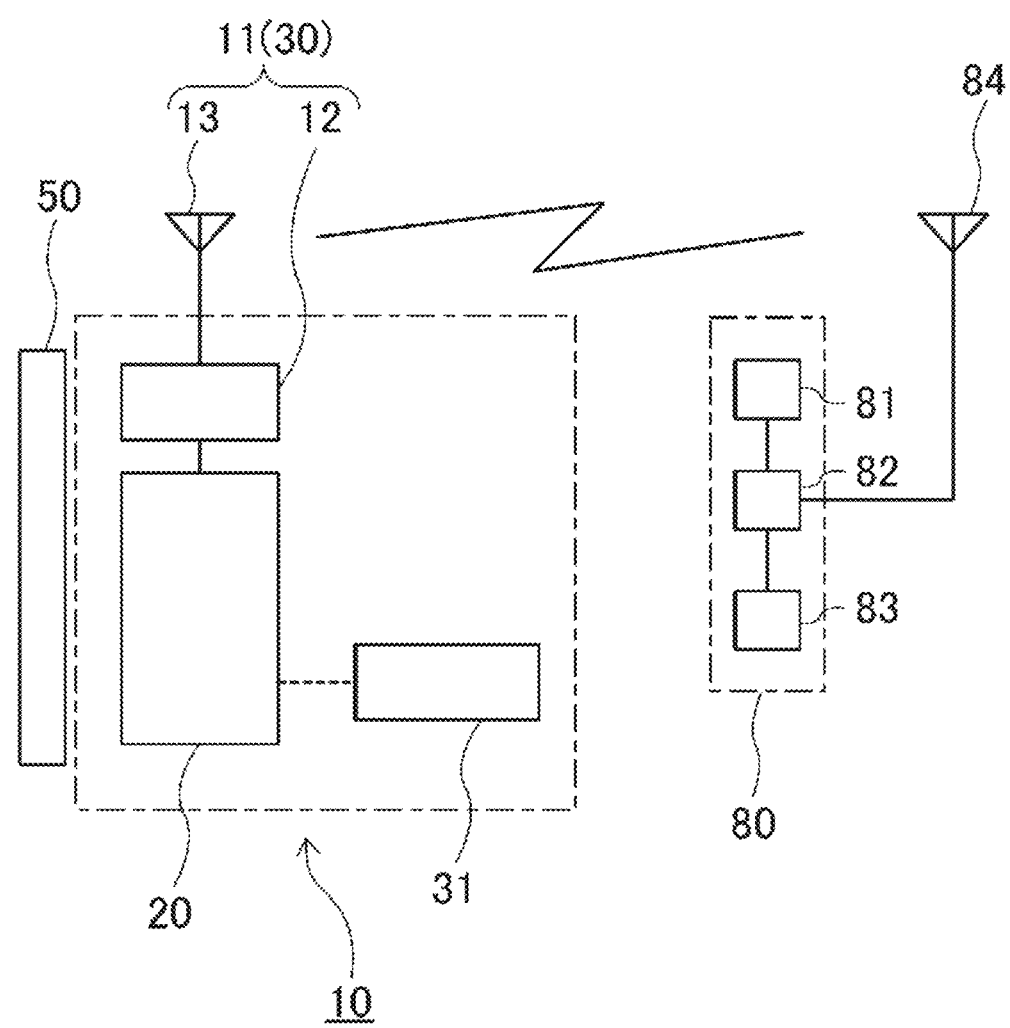
FIG. 6 is a block diagram showing a configuration of an IC tag system for an instrument according to a second embodiment of the present invention.

A second embodiment shown in FIG. 6 is different in that power supply and communication with respect to the IC tag unit 10 are performed by use of a reader writer 80, instead of the long range communication unit 70. The reader writer 80 includes a transmission/reception unit 81, a control device 82, a touch panel 83, and an antenna 84, and can perform operation described above with respect to the IC tag unit 10 via the touch panel 83. Further, also during maintenance of the long range communication unit 70 or power failure, reading and the like of the indicator can be performed by use of the reader writer 80.

Figure 7:
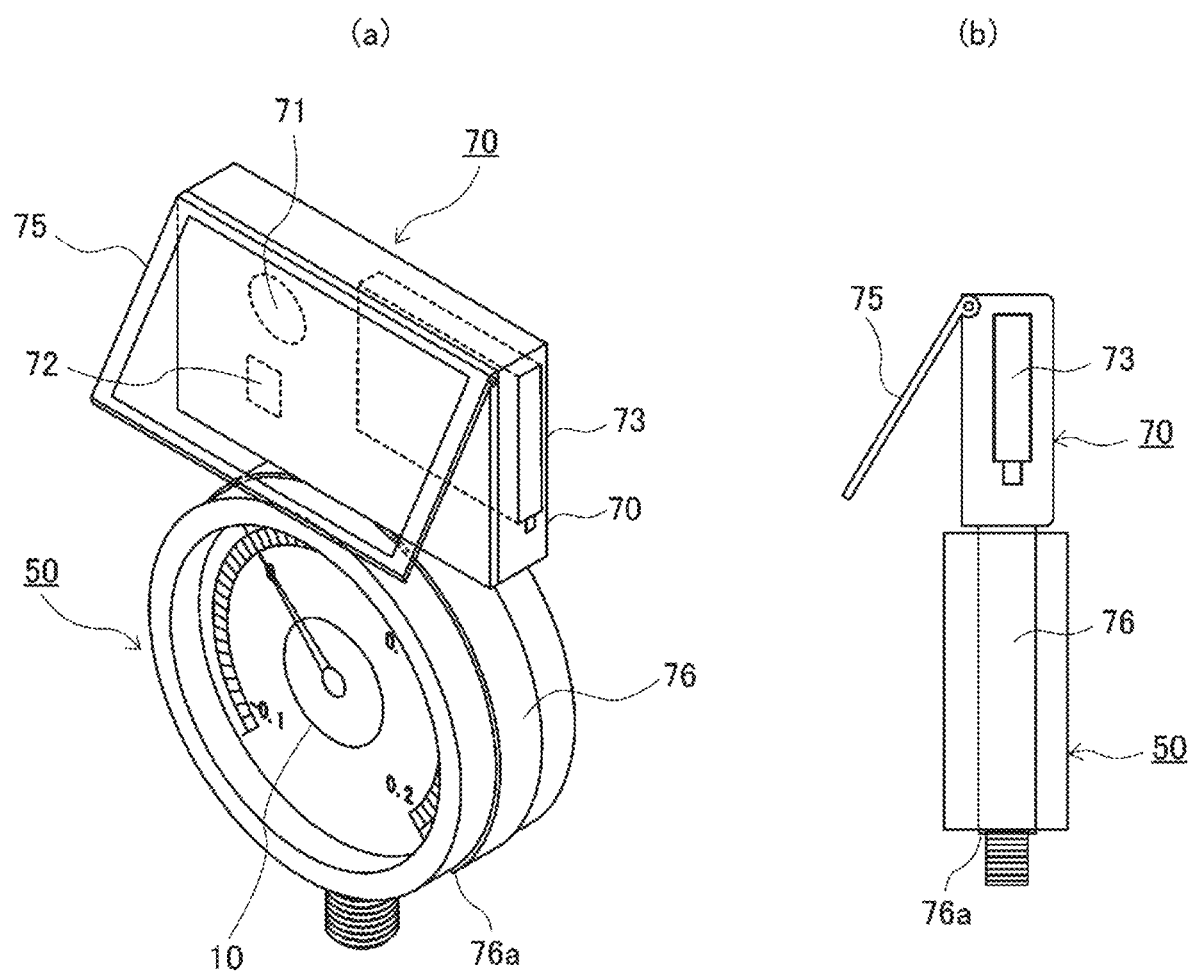
FIG. 7 shows a state in which an IC tag system for an instrument according to a third embodiment of the present invention is mounted, in which (a) is a perspective view of the instrument, and (b) is a side view thereof.

In the second embodiment of the present invention shown in FIG. 7, the long range communication unit 70 is fixed on the instrument 50 by means of a plate spring 76 having an open lower end 76a. This unit 70 includes the short range communication module 71, the long range communication module 72, and the battery 73 as in the embodiment described above, but further, includes a solar battery 75, and generated power therein is charged into the battery 73 to be used. By supplying induction current from the reader writer 80 to the IC tag 11 and the proximity sensor 21, it is possible to read the value of the sensor even in a state where there is no power supply during maintenance and inspection, and it is possible to read the pressure value even in a state where the indicator cannot be seen such as when the glass is dirty.

Figure 8A:
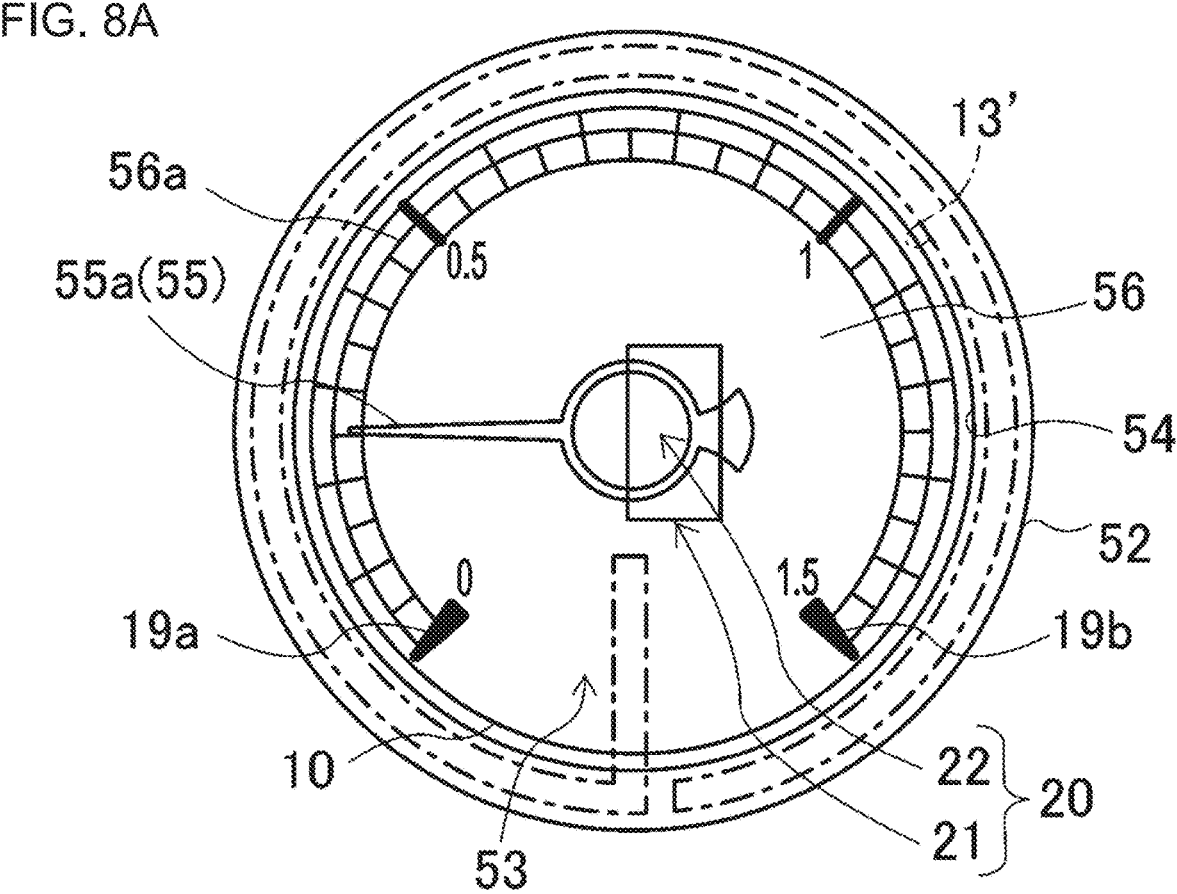
FIG. 8A is a diagram showing the relationship between an IC tag unit and an indicator and is a diagram showing a normal mounting state, according to a fourth embodiment of the present invention.
Figure 8C:
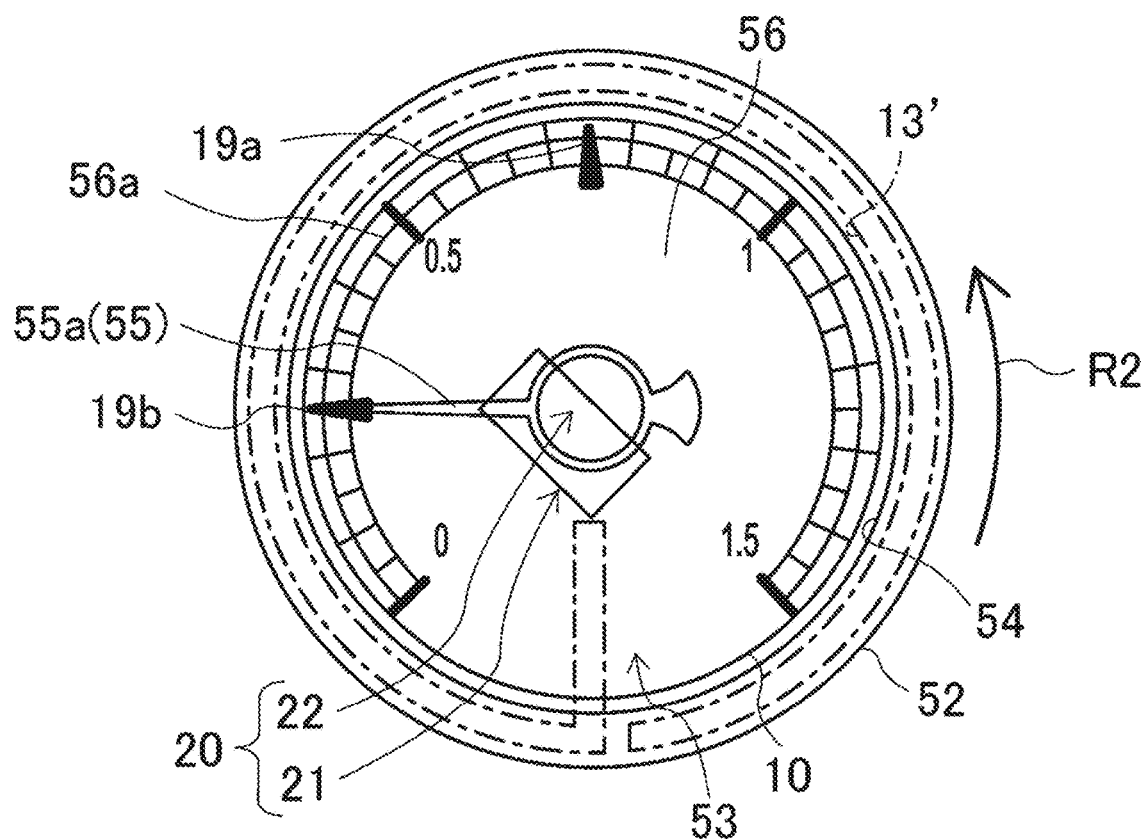
FIG. 8C is a diagram showing the relationship between the IC tag unit and the indicator and is a front view showing a state of maximum value calibration, according to the fourth embodiment of the present invention.

In a fourth embodiment shown in FIGS. 8A to 8C, calibration regarding the zero point and the maximum point is performed without moving the indicator 55. In the present embodiment, as shown in FIG. 8A, the IC tag unit 10 is formed so as to have a larger diameter than in the embodiments described above, and the outer periphery of the IC tag unit 10 is located near the scale increments 56a of the instrument 50. Further, a first pointer 19a and a second pointer 19b are provided so as to be respectively located at the zero point and the maximum point of the scale increments 56a.

For calibration, as shown in FIG. 8B, first, in order to make the first pointer 19a overlap an indicating portion 55a of the indicator 55, the IC tag unit 10 is rotated in the direction of an arrow R1 together with the transparent cover plate 53 until the first pointer 19a and the indicating portion 55a are overlapped with each other. In this state, the zero point calibration described above is performed. Next, as shown in FIG. 8C, the IC tag unit 10 is rotated in the direction of an arrow R2 together with the transparent cover plate 53 until the second pointer 19b and the indicating portion 55a are overlapped with each other. In this state, the maximum point calibration described above is performed. Then, the IC tag unit 10 is rotated until the state shown in FIG. 8A is realized, and the calibration ends. When the IC tag unit 10 is rotated, the facing 54 and the antenna 13' may be simultaneously rotated, but may be rotated with the connector 13b' of the antenna 13' removed.

The conductive target 22 described above may be provided with a projection similar to the indicating portion 55a. As a result, if rotation is performed such that the projection of the conductive target 22 is aligned to each of the zero point and the maximum point of the scale increments 56a and the above described calibration operation is performed for each alignment, the above calibration can be performed by rotating the conductive target 22 to a position where the projection is overlapped with the indicating portion 55a.

INDUSTRIAL APPLICABILITY

The present invention, when mounted to an existing instrument, can be used as a support device for checking calibration of the instrument and for performing periodic inspection of the instrument. The present invention can be used for existing instruments, for example, industrial instruments such as pressure gauges, thermometers, flowmeters, and power meters.

DESCRIPTION OF THE REFERENCE CHARACTERS

10: IC tag unit for instrument
11: IC tag
12: IC chip
13: antenna
14: sheet
14a: first sheet
14b: second sheet
15: attachment layer
20: scale increment reading module
21: proximity sensor
21a: detection coil
22: conductive target
23: sheet
24: conductive pattern
25: attachment layer
30: wireless reader
31: power module
50: instrument
51: case body
52: cover
53: transparent cover plate
54: facing
55: indicator
55a: indicating portion
56: scale plate
56a: scale increment
57: Bourdon tube mechanism
70: long range communication unit
71: short range communication module
72: long range communication module
73: battery
74: antenna
75: solar battery
76: fixing tool
80: reader writer
81: transmission/reception unit
82: control device
83: touch panel
84: antenna
91: smartphone (mobile terminal)
92: PC

The invention claimed is:
1. A method for calibrating an instrument provided with an IC tag unit, the IC tag unit comprises:
   a scale increment reading module that is configured to:
      detect, when an indicator in an instrument rotates, rotation of the indicator, and
      convert the rotation into rotation data; and
   an antenna that is configured to transmit the rotation data wirelessly from the IC tag unit to a reader;
   wherein the IC tag unit is configured to be sited in a manner that permits the indicator to remain viewable when the IC tag unit is affixed to the instrument;
   wherein the instrument comprises a scale plate, scale increments on the scale plate remain viewable when the IC tag unit is affixed to the instrument; and
   wherein the instrument comprises a transparent cover plate, the IC tag unit is affixed to the transparent cover plate when the IC tag unit is affixed to an instrument;
   the method comprising:
      rotating the IC tag unit together with the transparent cover plate until an indicating portion of the indicator overlaps a first pointer on the scale plate;
      rotating the IC tag unit together with the transparent cover plate until the indicating portion overlaps a second pointer on the scale plate; and
      rotating the IC tag unit together with the transparent cover plate until the first pointer and the second pointer are overlapped with corresponding portions of the scale increments of the scale plate.

* * * * *